June 20, 1939.  W. W. HAASE  2,163,171
SECTIONAL BURIAL APPARATUS
Filed April 23, 1936    9 Sheets-Sheet 1

June 20, 1939.  W. W. HAASE  2,163,171
SECTIONAL BURIAL APPARATUS
Filed April 23, 1936  9 Sheets-Sheet 3

Inventor:
Wilbert W. Haase.
By: Raymond D. Schnoor
Atty.

June 20, 1939. W. W. HAASE 2,163,171
SECTIONAL BURIAL APPARATUS
Filed April 23, 1936 9 Sheets-Sheet 4
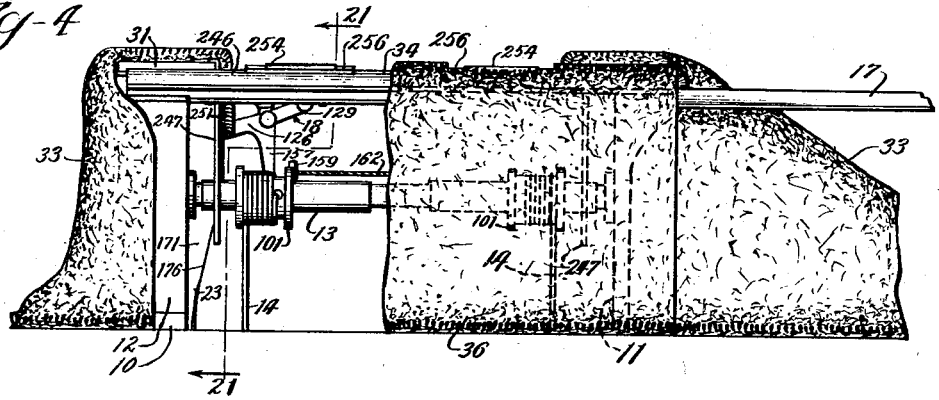
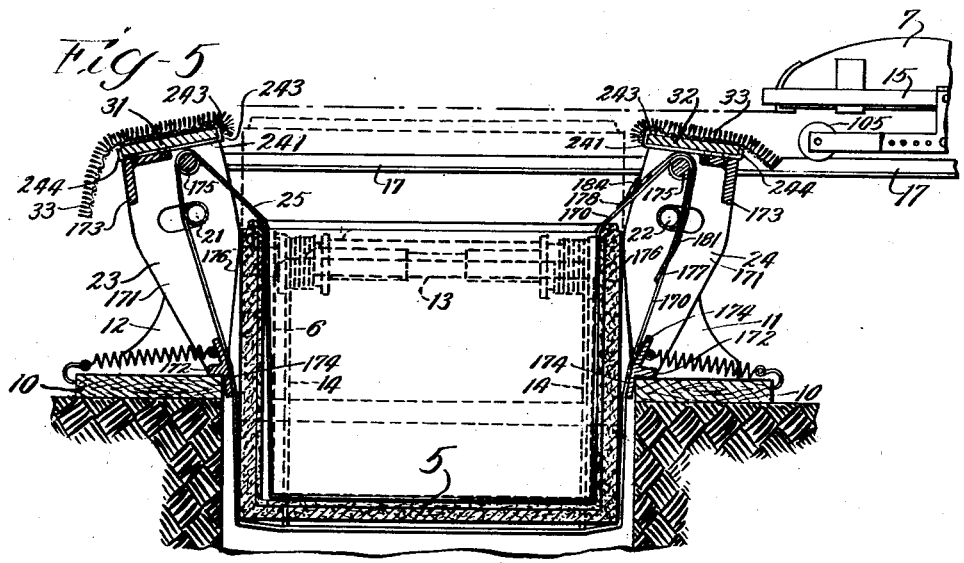
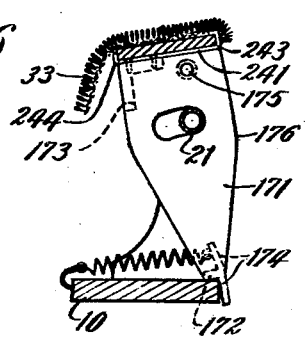
Inventor.
Wilbert W. Haase.

June 20, 1939.  W. W. HAASE  2,163,171
SECTIONAL BURIAL APPARATUS
Filed April 23, 1936  9 Sheets-Sheet 5

Inventor,
Wilbert W. Haase.
By: Raymond D. Schnoor
Atty.

June 20, 1939.                W. W. HAASE                 2,163,171
                     SECTIONAL BURIAL APPARATUS
                    Filed April 23, 1936        9 Sheets-Sheet 6

Inventor
Wilbert W. Haase,
By: Raymond D. Schnoor
                                                    Atty.

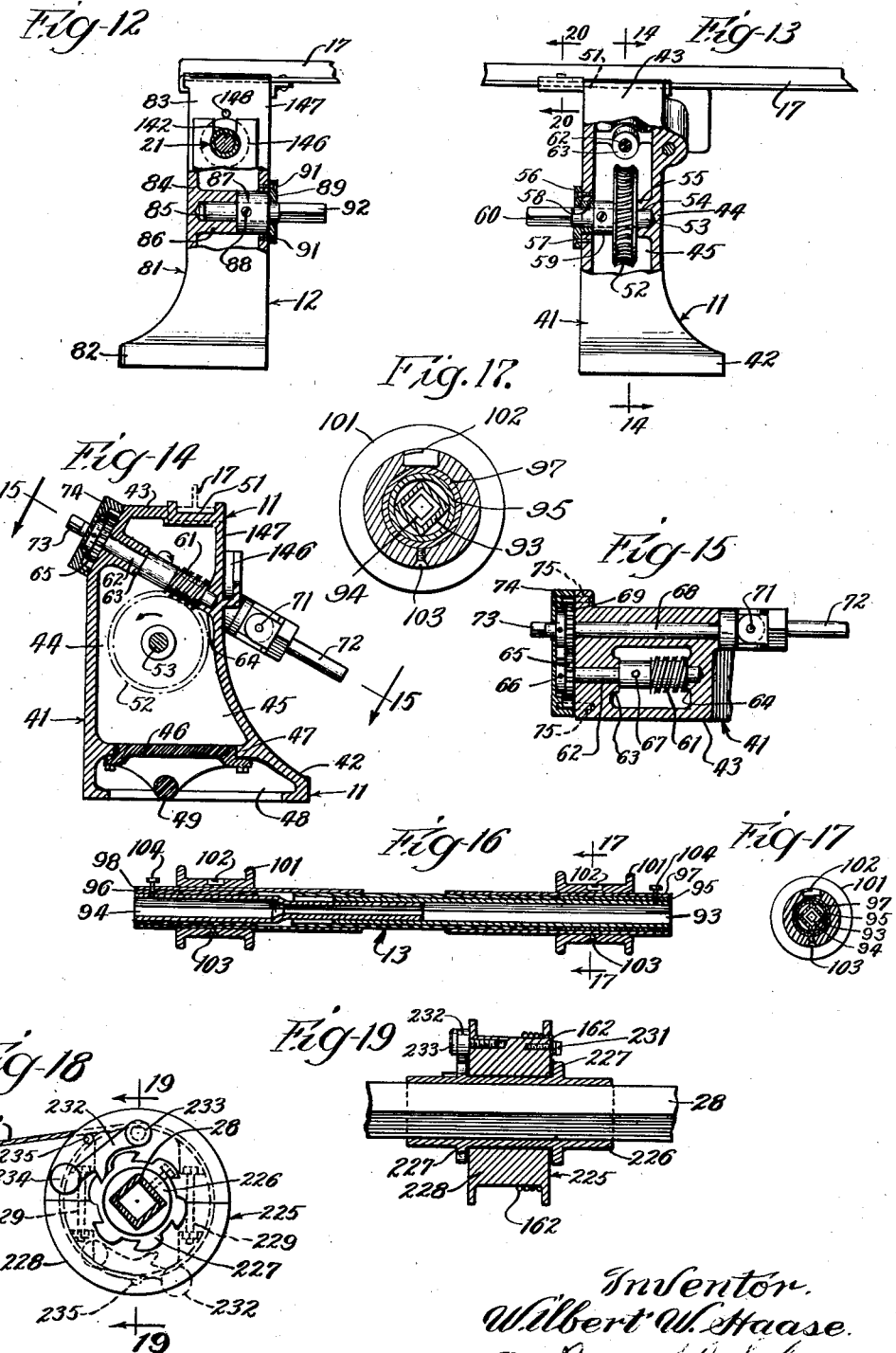

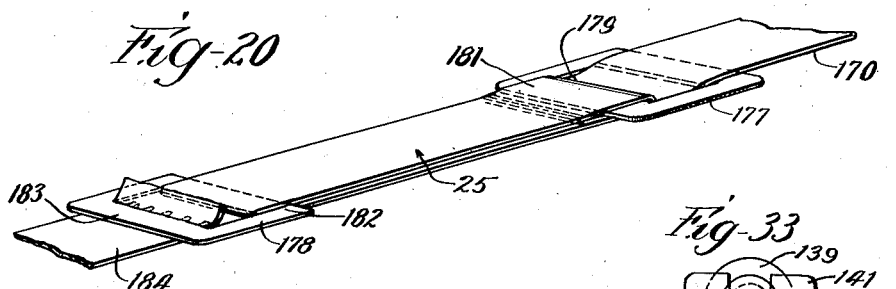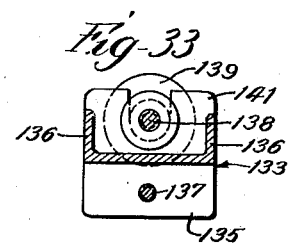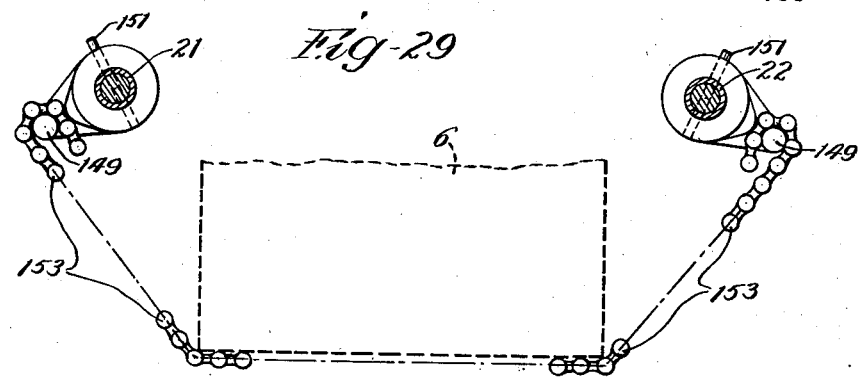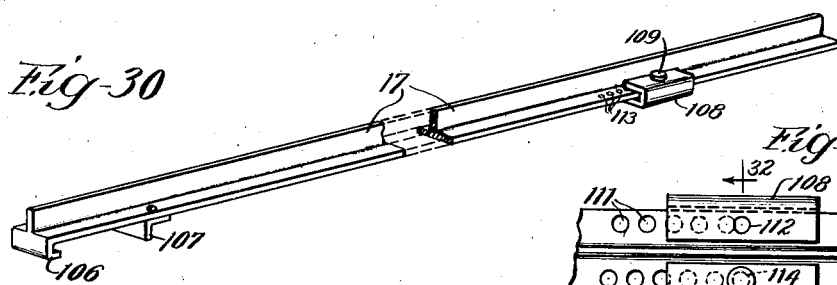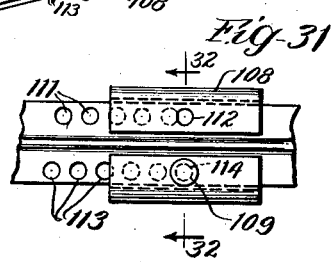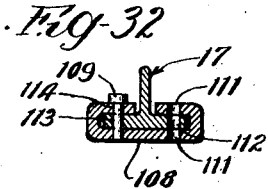

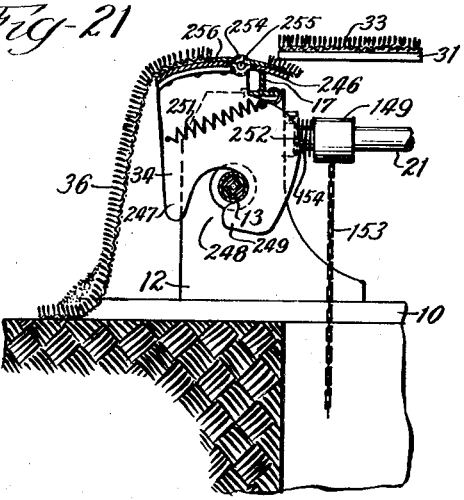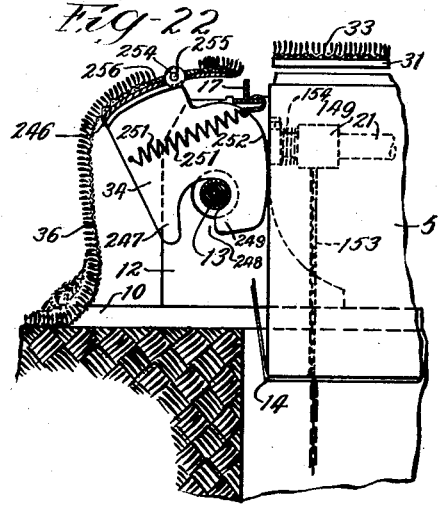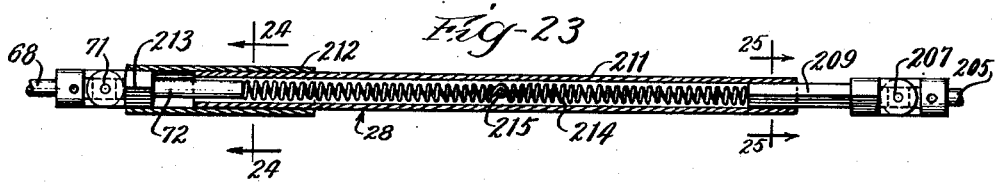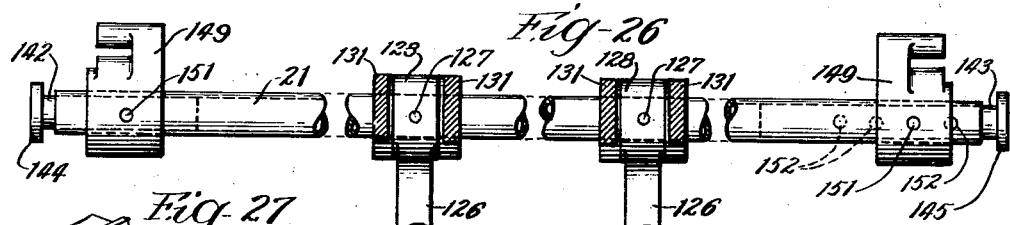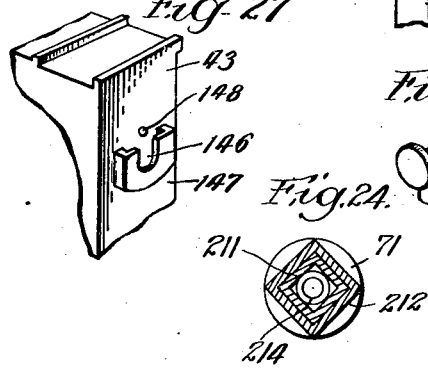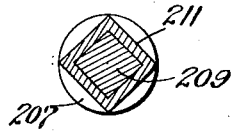

Patented June 20, 1939

2,163,171

UNITED STATES PATENT OFFICE 2,163,171

SECTIONAL BURIAL APPARATUS

Wilbert W. Haase, Forest Park, Ill., assignor to Wilbert W. Haase Co., Forest Park, Ill., a corporation of Illinois Application April 23, 1936, Serial No. 75,952

38 Claims. (Cl. 27—32)

This invention relates to a sectional burial apparatus and more particularly to a sectional and collapsible apparatus which is particularly adapted for burial purposes.

An important object of the invention is to provide such an apparatus which may be readily assembled over a grave excavation when required and in accordance with requirements and which may be readily collapsed or disassembled for transportation and storage or the like.

Another important object of the invention is to provide such an apparatus which may be assembled to form a light weight, sturdy and collapsible, sectional winch mechanism for use in lowering vaults, caskets or other burial containers into grave excavations and upon occasion to form, in addition thereto and for cooperation therewith, suitable apparatus whereby a casket may be supported over and lowered into a vault as an incident to operation of the winch mechanism and for supporting and adjusting concealing devices whereby the operative mechanism is concealed during a burial ceremony.

Another important object of the invention is to provide such an apparatus which is or may be power operated and arranged for remote control.

Another important object is to provide a temporary casket supporting mechanism which is adjustable in operation from a casket supporting position above a vault to an unobstructive position beyond the outer limits of the vault to permit of the passage of at least a portion of the vault through the temporary support mechanism for receiving a cover.

Another important object of the invention is to provide an adjustable temporary support mechanism which may be adjusted for level or the like.

Other objects and advantages of the invention such as the economy of construction and efficiency of operation will be apparent as it is better understood from the following description, which, taken in connection with the accompanying drawings, discloses a preferred embodiment thereof.

Referring to the drawings.

Fig. 4 is an end elevational view, viewing Fig. 1, from the lower end and partly broken way to show details of construction.

Fig. 5 is a sectional view similar to Fig. 3, taken substantially on line 5—5, in Fig. 2, and showing parts in changed positions to illustrate operation thereof.

Fig. 6 is a detail elevational view of a shiftable bearing plate.

Fig. 10 is an elevational view of the apparatus shown in Fig. 7, and viewing Fig. 7, from the left.

Fig. 11 is a similar elevational view showing a more complete assembly substantially as included in Fig. 2.

Figs. 12 and 13 are broken away elevational views of parts of the winch mechanism.

Fig. 14 is a sectional view taken substantially on line 14—14, in Fig. 13, and showing detail of construction of the winch pedestal.

Fig. 15 is a sectional view taken substantially on line 15—15, in Fig. 14.

Fig. 16 is a longitudinal sectional view of the winch shaft illustrating details of construction thereof.

Fig. 17 is a section taken substantially on line 17—17, in Fig. 16.

Fig. 18 is an enlarged detail view illustrating details of construction of the snub control drum.

Fig. 19 is a section taken substantially on line 1919, in Fig. 18.

Fig. 20 is a perspective view illustrating details of construction of the flexible elements.

Fig. 21 is a section taken substantially on line 21—21, in Fig. 4, illustrating an end cover and concealing blanket.

Fig. 22 is a similar view in a changed position, illustrating operation thereof.

Fig. 23 is a longitudinal sectional view illustrating detail of construction of a power connecting shaft. Figs. 24 and 25 are sectional views taken on lines 24—24, and 25—25, respectively, in Fig. 23.

Fig. 26 is a broken and collapsed view illustrating details of construction of a locating shaft.

Figs. 27 and 28 are perspective views of a portion of a pedestal and a part of the locating shaft respectively and illustrating a form of connection therebetween.

Fig. 29 is a diagrammatical illustration of a means for connecting the locating shaft to the burial vault for control or adjustment thereby.

Fig. 30 is a perspective view of a carriage track.

Fig. 31 is an enlarged plan view of a portion of the track and the slide plate.

Figure 9:
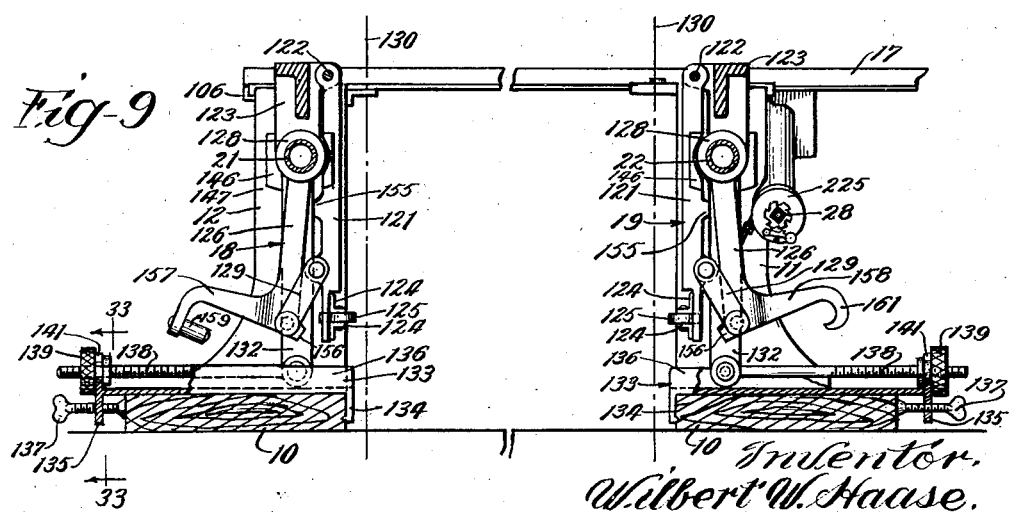
Fig. 9 is a sectional elevation similar to Fig. 8, and showing certain parts collapsed or retracted.

Fig. 32 is a sectional view taken substantially on line 32—32, in Fig. 31, and rotated ninety degrees to an upright position, and;

Fig. 33 is a section taken substantially on line 33—33, in Fig. 9.

This application embodies certain features of my copending application for Burial windlass, Serial Number 688,902, filed September 11, 1933, which is to be abandoned in favor of this application incorporating further improvements and also includes in cooperative relationship the cover carrier disclosed and claimed in my co-pending application for Burial apparatus, Serial Number 710,138, filed February 7, 1934, now Letters Patent No. 2,112,236, dated March 29, 1938, and the interlocking track disclosed and claimed in my co-pending application for Burial winch and carriage support, Serial Number 33,531, filed July 27, 1935.

To illustrate the invention I have shown a series of devices which may be assembled to form a plain burial winch (Figs. 7, 10 and 12 to 16 inclusive) by means of which a burial vault 5, or other burial container may be lowered into a grave excavation and other devices continuing the series which may be added thereto to form more complicated or complete assemblies whereby in addition to the lowering of the burial vault 5, a casket 6, may be received and deposited into the burial vault, and the vault cover may be removed and reassembled after the entry of the casket 6, and whereby the apparatus may be power actuated and substantially concealed upon occasion.

In the present embodiment these series include a winch pedestal 11, a plain bearing pedestal 12, a drum shaft 13, and carrier cables 14, assembled in duplicate or in pairs to form winch units arrangeable at the opposite ends of a grave excavation with the carrier cables 14, connected to the drum shafts 13, of each winch unit. Obviously any burial container may be carried by the carrier cables 14.

When a burial vault is to be raised or lowered by the winch units cover carriers 15, and 16, of the type and character shown and described in my co-pending application above mentioned are assembled on tracks 17, which in the present embodiment are supported on the winch units and arranged to form rigid spacing devices whereby the winch drum shafts 13, are relieved of axial strains during operation of the winch units.

In addition to the above when the apparatus is assembled for receiving a casket 6, and depositing the casket into the burial vault 5, a more extensive series of parts are assembled and include in addition to the above, left and right temporary support units 18 and 19, respectively, arranged in pairs and in spaced relationship on locating shafts 21 and 22, arranged for support on the winch pedestals 11 and 12, and casket lowering means including bearing brackets 23 and 24, also arranged in pairs on the locating shafts 21 and 22, and flexible elements 25 and 26, cooperating with the brackets 23 and 24, and arranged to receive the casket 6, and deposit same into the burial vault 5.

The above apparatus is arranged for manual operation by means of a suitable crank, and a power unit 27, which is operably connected to the winch pedestals 11, by means of connecting shafts 28 and 29, may be attached where conditions permit.

The series of devices is further extended by frame parts 31 and 32, to which suitable concealing blankets 33, may be attached, and end cover attachments 34 and 35, carrying similar concealing blankets 36.

In accordance with my invention the above devices are preferably arranged for interlocking attachment or so that they may be readily assembled and disassembled without the aid of complicated tools and in a relatively short time so that the apparatus may be assembled for use in accordance with requirements and after use may be readily disassembled for transportation and storage. This feature will be obvious from the following description of the above-mentioned devices.

The winch pedestal 11, (Fig. 13, 14 and 15), includes a body 41, having a flared or enlarged base portion 42, a head or top portion 43, and an intermediately disposed bearing portion 44. The body 41, is preferably of aluminum cast to form and cored hollow to reduce weight and to provide an internal lubricant chamber and gear housing 45, and a closure cap 46, secured to a flange 47, extending about the interior walls of the body 41, seals the housing 45. The flange 47, is preferably spaced from the lower extremity of the body 41, so that a cavity 48, is formed between the cap 46, and the end of the body 41, and a suitable handle device 49, may be formed on the cap 46, by means of which the pedestal may be carried.

A socket or transverse slot 51, may be formed in the top portion 43, of the body 41 for receiving a track 17, or other brace device as will be later described.

A winch gear 52, which is preferably a worm gear, is mounted on and secured to a shaft 53, having a bearing 54, in a boss 55, formed in the bearing portion 44, of the housing 41, and a similar bearing in a closure cap 56, suitably secured to the housing 41, by means of screws 57, or the like. An annular portion 58, of the cap 56, engages a hub portion 59, of the gear 52, and cooperates with the boss 55, to prevent axial movement thereof.

A spindle portion 60, of the shaft 53, which may be of rectangular form, in cross-section, extends from the body 41, for engaging and driving the drum shaft 13, as will be later described.

To provide a suitable means for actuating the winch gear 52, a worm 61, is secured to a jack shaft 62, which is rotatably mounted in bearing bosses 63, and 64, formed in the body 41, adjacent the worm gear 52. The jack shaft 62, extends from the body 41, to receive a spur gear 65, and the spur gear 65, and worm 61, are suitably secured for rotation with the jack shaft 62, by means of pins 66, and 67.

A split or two way drive for the jack shaft 62, for facilitating either hand crank or power operation of the winch mechanism is effected by means of a counter shaft 68, journalled on the body 41, in substantially parallel relationship with respect to the jack shaft 62, and extending from the body 41, to receive a spur gear 69, positioned to mesh with the spur gear 65, carried by the jack shaft 62. A universal joint device 71, may be formed on or suitably secured to the shaft 68, a spindle 72, extends from the universal joint device, and a driving connection is provided as will be later described.

An extended end 73, of the shaft 68, which is of key form, such as rectangular, facilitates direct engagement and actuation of the shaft by means of a suitable hand crank or like device, and a cover 74, which is apertured to receive the end 73, and suitably secured to the body 41, such as by means of screws 75, or the like, conceals and forms a lubricant chamber about the gears 65 and 69.

The plan bearing pedestal 12, (Fig. 12), similarly includes a body 81, having a flared or enlarged base portion 82, a head or top portion 83, and an intermediately disposed bearing portion 84, all of which are preferably similar in every respect to the corresponding portions of the winch pedestal body 41. An idler shaft 85, is journalled in a boss 86, formed in the body 81, and is located axially by means of a collar 87, secured to the shaft by means of a set screw 88, or the like. The collar 87, being rotatably secured between the boss 86, and a cover member 89, which is secured to the housing 81, by means of suitable screws 91.

A spindle portion 92, extended from the shaft 85, and of similar form to the spindle 60, provides a rotatable support for the drum shaft 13, as will be later described.

The drum shaft 13, is preferably an extensible shaft to facilitate adjustment thereof in accordance with grave excavations of various dimensions and burial containers of various sizes, and to accomplish this I have shown, (Figs. 16 and 17), telescoping tubes 93 and 94, formed in cross-section at least at their open ends, in accordance with and to provide sockets for receiving the spindles 60 and 92, of the pedestals 11 and 12. In the present embodiment this cross-sectional form is square and a portion of the tube 94, is reduced in dimensions to telescope within and rotate with the tube 93. The maximum extended and telescoped length of the drum shaft is determined by requirements.

Spacing tubes 95, and 96, are arranged over and suitably secured to the tubes 93 and 94, and cover tubes 97 and 98, are arranged over and similarly secured to the tubes 95 and 96, such as by welding. The cover tubes 97 and 98, are substantially of equal length, the tube 96, is preferably relatively short, and the tube 95, is sized and of sufficient length to telescope within the tube 98.

Flanged winding drums 101, or spools, having sockets 102, therein wherein, the carrier cables 14, may be engaged, are secured to the telescoping shaft assembly above described adjacent the ends thereof, such as by set screws 103, or other suitable fastening means.

Set screws 104, facilitate rigid attachment of the drum shaft 13, to the spindles 60 and 92, of the pedestals 11 and 12.

The carrier cables 14, are preferably wire cables of suitable length and adapted for engagement in the sockets 102, of the winding drums 101.

Figure 7:
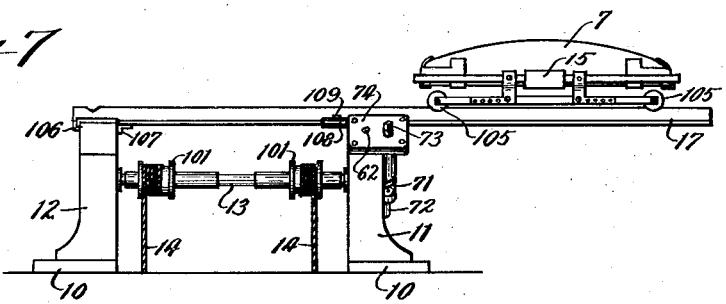
Fig. 7 is a small scale end elevational view of an assembly of certain parts of the sectional apparatus.

A plain burial winch for raising or lowering burial containers is formed of two units each one of which includes one winch pedestal 11, one plain bearing pedestal 12, one drum shaft 13, and one carrier cable 14, and to facilitate the power drive connection with the power unit 27, which will be later described, these units are preferably made for left and right hand drive. This is accomplished by making the pedestals 11 and 12, one left and one right of each. All other parts are interchangeable and reversible. Suitable planks 10, are arranged in parallel relationship along opposed edges of a grave excavation and the winch units are positioned for support thereon and adjacent the ends thereof, as illustrated (Figs. 7 and 10).

The vault cover carriers 15 and 16, are roller carriage devices arranged for attachment to the ends of a cover 7, of the vault 5, and to support the cover 7, for movement along the tracks 17, and upon anti-friction rollers 105. These devices are described and claimed in my co-pending application for Burial apparatus, Serial Number 710,138, filed February 7, 1934, and since any suitable carriage device may be used in cooperative relationship these devices will not be further described.

The tracks 17, may be of rolled steel and of any suitable cross-sectional form for supporting the roller carriage devices and the preferred form is inverted T-shaped rolled steel track fully shown, described and claimed in my co-pending application for Burial winch and carriage support, Serial Number 33,531, filed July 27, 1935, and in accordance with this invention the tracks 17, are utilized as spacing devices whereby the drum shafts 13, are relieved of end thrust such as may occur under loaded conditions.

To accomplish this, in addition to the arrangement of the tracks 17, in the sockets or slots 51, formed in the top portions of the pedestals 11 and 12, a hook portion 106, formed at an end of the tracks, and an abutment plate 107, secured to the tracks 17, by rivets or the like, (Figs. 12, 13, 14, 30, 31 and 32), a slide plate 108, is slidably mounted on the base flanges of the tracks 17, and when locked in adjusted relationship by means of a latch pin 109, forms a relatively rigid abutment engaging the inner face of the pedestal in opposed relationship to that pedestal engaged by the abutment plate 107, and to which the track 17, is interlockingly attached. Adjustability is facilitated by a series of holes 111, arranged in alignment with a hole 112, in the slide 108, and in staggered relationship with a similar series of holes 113, arranged in alignment with a hole 114, in the slide 108, in either series of which the latch pin 109, may be engaged.

Figure 1:
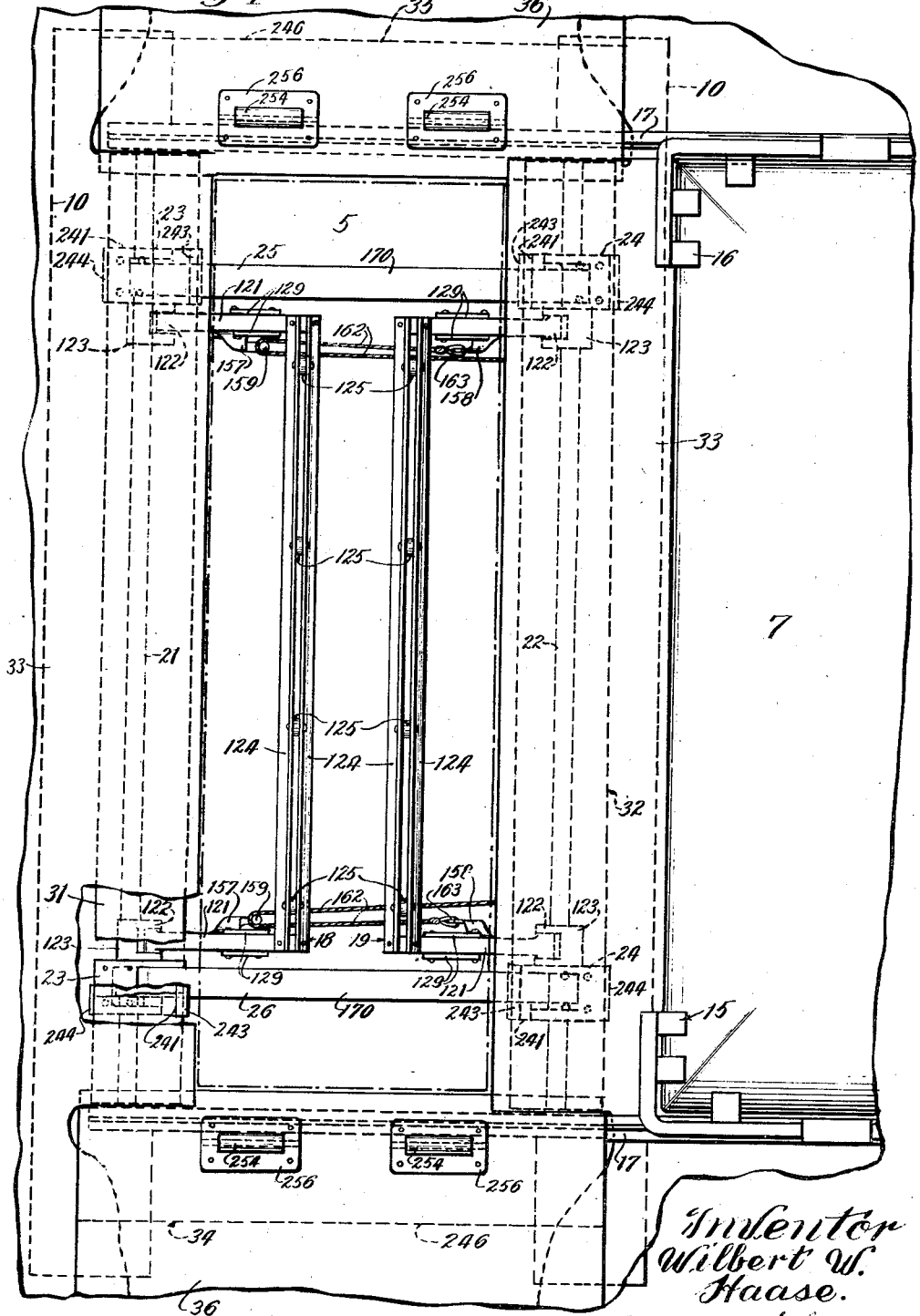
Figure 1 is a plan view of an assembled burial apparatus embodying my invention, broken away in part to show details of construction.
Figure 2:
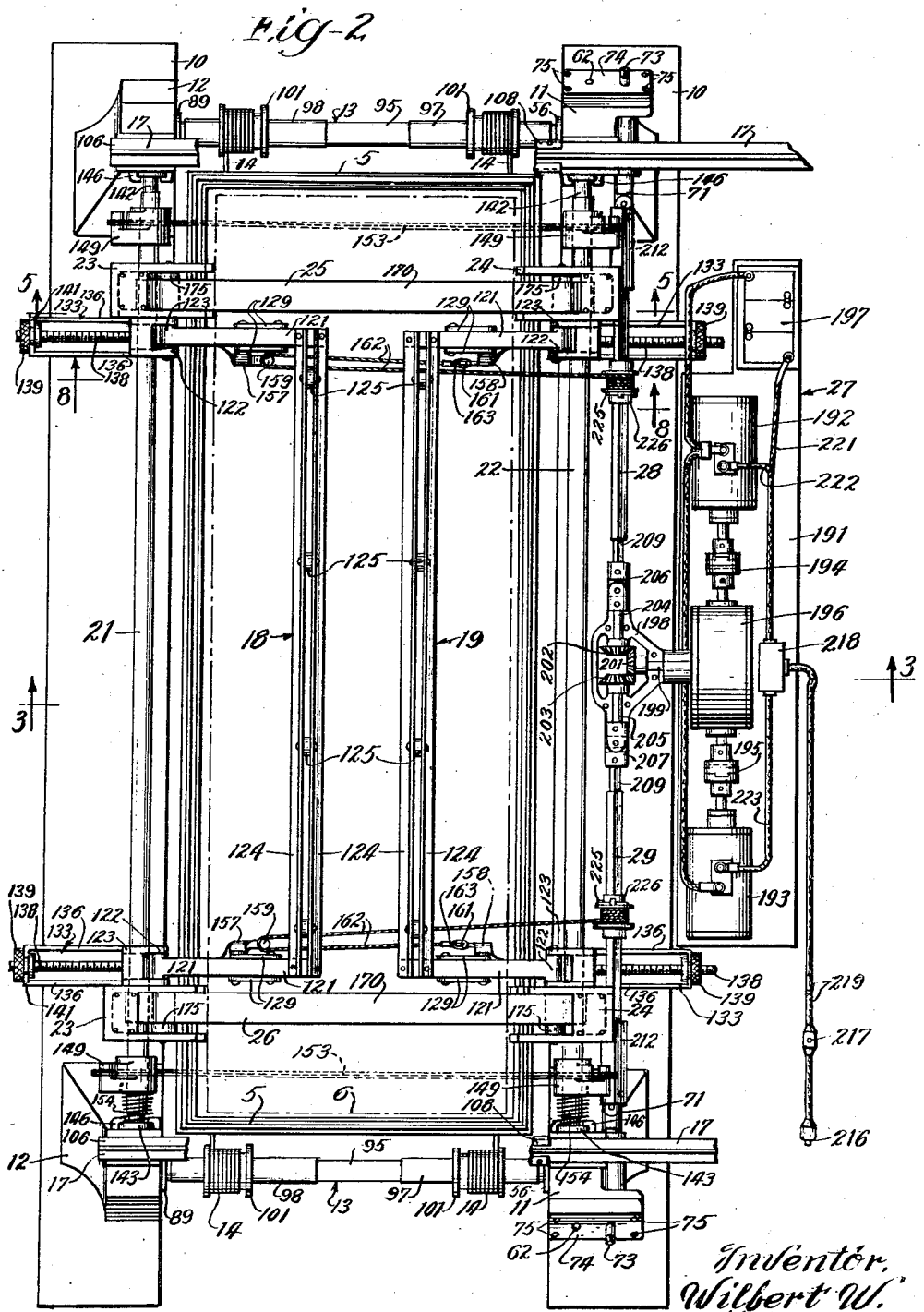
Figure 2 is a similar plan view with concealing devices removed and showing one arrangement of the apparatus.
Figure 3:
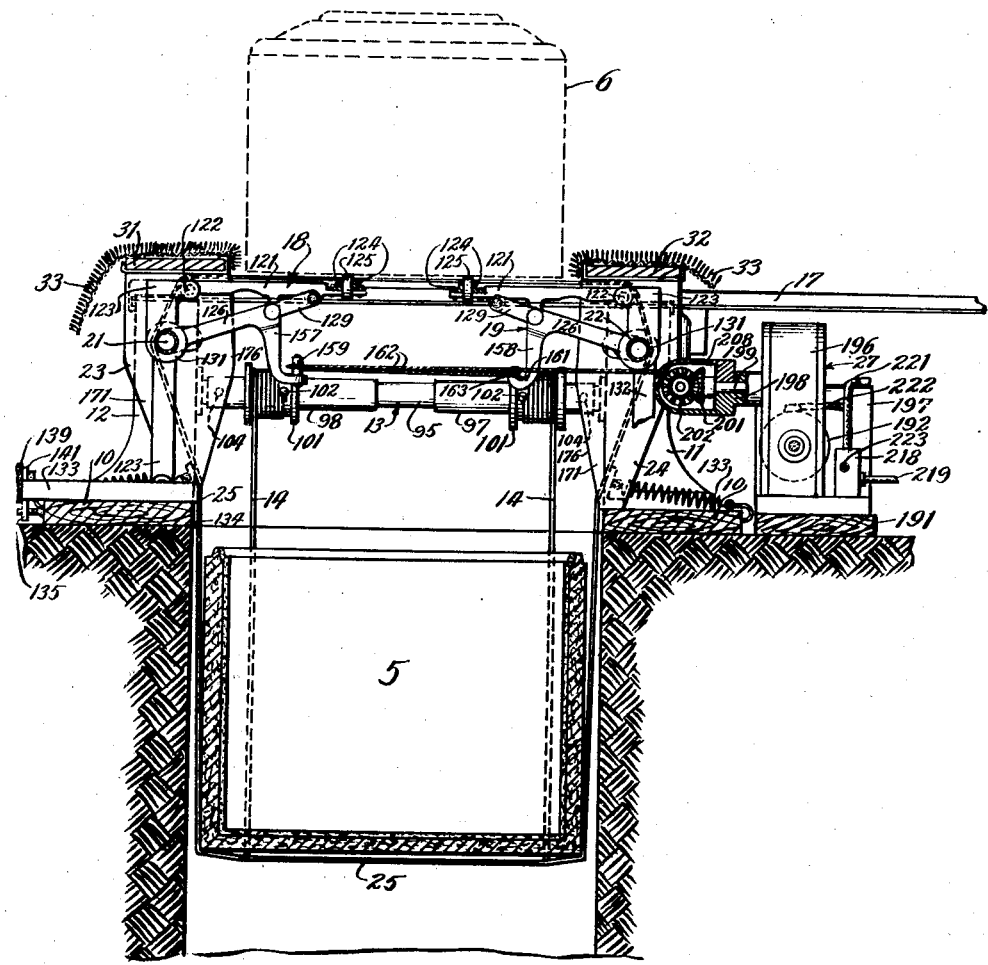
Fig. 3 is a sectional view taken substantially on line 3—3, in Fig. 2, and illustrating the elevational relationship and cooperation of certain parts.

It is an object of this invention to provide a new and efficient temporary support mechanism which is adapted to receive and support a casket 6, over or above a burial vault 5, which is suspended in a grave excavation and from the winch apparatus above described, as illustrated (Figs. 3 and 8), in preparation for the entry thereof into the burial vault, and such a mechanism which will be collapsible to an unobstructive position, such as will permit the vault or a part thereof to be moved through the mechanism as illustrated (Fig. 5), so that the cover 7, may be assembled to the vault 5, after the entry of the casket 6, without disorganizing or d'sassembling the apparatus, and to provide such a mechanism I have shown (Figs. 2, 3, 8, 9, 11, 26 and 29), left and right temporary units 18 and 19, respectively.

Figure 8:
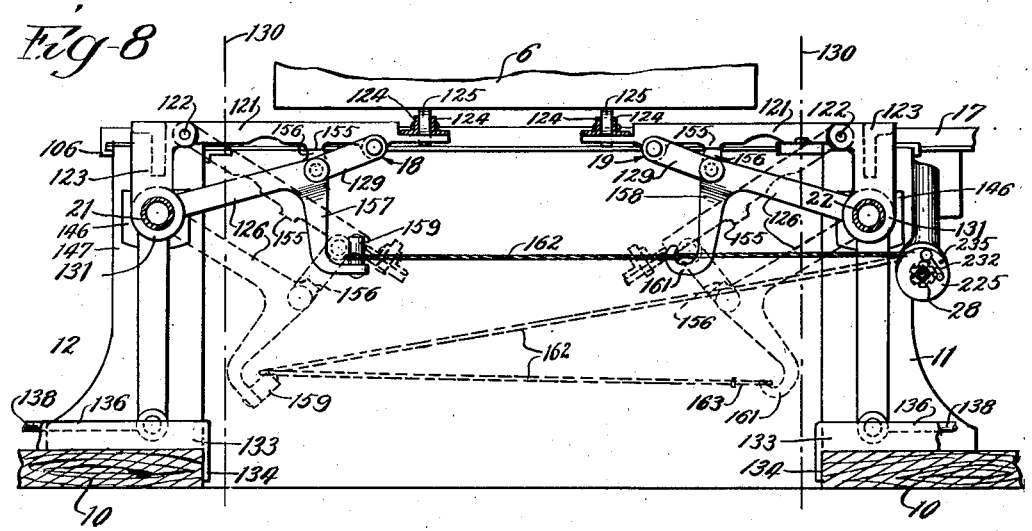
Fig. 8 is an enlarged sectional view taken substantially on line 8—8, in Fig. 2, and illustrating the operation of parts included in a more complete assembly of the apparatus.

The temporary support units 18 and 19, are substantially alike in form and each one thereof includes a support arm 121, pivotally connected at 122, to a bracket 123, and a latching means whereby the arm 121, is rendered rigid while in casket receiving position (Fig. 8). Two or more sets of the arms 121, and brackets 123, are arranged along each one of the locating shafts 21, and 22, as shown (Fig. 2), and suitable guide rails 124, are attached to the extremities of the arms 121, and carry anti-friction rollers 125, rotatably mounted at suitable intervals along the guide rails.

To provide a latching means for the arms 121, I have shown toggle link devices including arms 126, arranged to be positioned on and secured to the locating shafts for rotation therewith, by means of suitable pins 127, extending through hub portions 128, thereof and into the locating shaft, and connected to the arms 121, through pivot links 129.

The relative length of the arm 126, and pivot links 129, is determined from the relative location of the locating shaft and the pivot connection 122, of the arm 121, and they are proportioned so that proper rotation of the locating shafts (Fig. 8), will effect the collapse or retraction of the toggle links and arms 121, into the position shown (Fig. 9), in which position the parts are all disposed outside of or beyond the path of movement of the burial vault 5, the lateral boundaries of which are indicated by dash and dot lines 130, (Figs. 8 and 9).

Spaced bearing hubs 131, are formed on the brackets 123, for rotatably receiving a locating shaft and to embrace the hub portion 128, of the toggle arm 126, for positively locating the arm 121, with respect to the arm 126, and for supporting the arm 121.

Means is provided for preventing rotary movement of the bracket 123, with respect to the locating shaft due to loading of the arms 121, and to accomplish this an arm 132, extends from the bracket 123, and is or may be suitably anchored.

In accordance with the present invention the arms 132, are anchored to the support planks 10, by means of devices which facilitate adjustment of the level or casket receiving position of the arms 121, in accordance with variations in ground level and so that when a casket is received thereby it will rest substantially level and not at an irregular angle. This is accomplished by means of an anchor bracket 133, having depending lugs 134, and 135, between which the plank 10, is received and upwardly extending webs 136, forming a channel therebetween into which the arm 132, extends and is guided. The anchor bracket 133, is rigidly secured to the plank 10, by clamping the plank against the lug 134, by means of a clamp screw 137, having threaded engagement in the lug 135, and the arm 132, is adjustably anchored to the bracket 133, by means of an anchor bolt 138, pivotally connected with the arm 132, and an adjusting nut 139, having threaded engagement therewith and rotatably engaged in a slot formed in an end flange 141, on the bracket 132, (Fig. 33).

Adjustment of the nut 139, rotates the bracket 123, about the locating shaft together with the arm 121, and determines the receiving position of the arm 121, and it will be noted that the interlocking or detachable connection of the nut 139, with the bracket 133, facilitates assembly and disassembly.

The locating shafts 21 and 22, shown in detail (Fig. 26), are alike in form and in accordance with my invention are extensible and adapted for interlocking connection with the pedestals 11 and 12, to form substantially parallel supports extending between the pedestals as shown (Figs. 2, 8, 9 and 11). To accomplish this and to obtain the maximum rigidity with a minimum of weight these shafts are formed of tubular stock, such as pipe, and bearing plugs 142, and 143, having annular flanges 144, and 145, at one end thereof are inserted and variably locked into the ends of the shafts with the flanges 144, and 145, thereof exposed for rotatable engagement in sockets 146, (Figs. 27 and 28), one of which is formed on the exterior of a wall 147, of each one of the pedestals 11 and 12, or upon walls of the pedestals which will be in opposed relationship upon assembly of the winch mechanism and between which the shafts 21 and 22, may be supported. A suitable lock pin may be inserted in an aperture 148, to lock the shaft in the socket 146, during operation.

In accordance with this invention the shafts 21, and 22, are connected for adjustment as an incident to movement of the burial vault effected by the winch mechanism and to accomplish this I have shown crank arms 149, positioned on the shafts and secured for rotation therewith by means of pins 151, which also extend into or through apertures 152, in the plugs 142, and 143, to lock the assembly in fixed relationship.

The crank arms 149, are suitably connected to the burial vault 5, by means of a flexible element such as a chain 153, which extends across and beneath the vault, (Figs. 2 and 29), and is interlockingly connected with a crank arm 149, at each end.

Lowering movement of the vault 5, diagrammatically illustrated, (Fig. 29), effects a counterclockwise movement of the locating shaft 21, and a clockwise movement of the shaft 22, and elevates and locks the arms 121, associated with these shafts while a reverse movement of the burial vault releases and permits the lowering of the arms 121. A suitable coil spring 154, (Figs. 2 and 11), may be mounted on each one of the locating shafts to engage the shaft or the arm 149, and the pedestals to insure complete collapsing movement or to bring the arms 121, into the position shown (Fig. 9).

Cooperating lugs 155, and 156, formed on arms 121, and 126, respectively, limit the movement of the toggle links so that the toggle latches will be released by the weight of the casket 6, as the torque is released from the shafts 21, and 22.

Snubbing means is provided for controlling the action of the arms 121, through the latching devices and to accomplish this depending arms 157, and 158, are formed on arms 126, which are to be operated in opposed relationship, as shown, (Figs. 8 and 9). The arm 157, is provided with a vertically disposed cylindrical roller 159, and the arm 158, terminates in a hook portion 161. A suitable strand or cable 162, having a looped end 163, to be engaged by the hook 161, is wrapped about the roller 159, and extended to a point where it may be restrained manually or by means to be later described. It will be noted that movement of the arms 126, to the dotted position (Fig. 8), completely releases the cable 162.

In accordance with my invention means is provided for depositing the casket 6, into the burial vault 5, as an incident to or subject to movement of the burial vault effected by the winch mechanism and to accomplish this I have shown, (Figs. 2, 3, 5, 6 and 11), the flexible elements 25, and 26, arranged to contact the burial vault 5, or for engagement therewith, and the bearing brackets 23, and 24, cooperating therewith. The flexible elements 25, and 26, are substantially loops of flexible material extending about or encircling the burial vault and the locating shafts 21, and 22, and the bearing brackets 23, and 24, are provided for aligning the flexible elements.

The bearing brackets 23, and 24, are of duplicate form and may be used in either left or right hand relationship. They are or may be formed of metal cast to form as a body and include spaced wall plates 171, and cross or connecting webs 172, and 173.

The cross web 172, is shaped to form a foot for transmitting load strains to the plank 10, and a guide plate 174, extending beyond the foot and substantially at right angles thereto which embraces and is locked against the plank 10, by the flexible elements in operation and also guides the elements over the edge of the plank to reduce wear between the parts, and the web 173, rigidly connects the plates 171, at or adjacent the tops thereof.

A guide spindle 175, is arranged to extend between the plates 171, above the locating shaft, over which the flexible element may be laced and by means of which the casket receiving level of the flexible element may be determined. This spindle is preferably rigidly secured between the plates 171, so that it will to some extent snub the flexible element under loaded conditions.

The plates 171, are intermediately apertured to receive the locating shaft 21, or 22, and the aperture is preferably arcuate in form to permit shifting of the plates 171, about the foot thereof from the position shown (Fig. 3), to the position shown (Figs. 5 and 6), subject to limits determined by the locating shaft and aperture therefor, and edges 176, of the plates 171, are cam shaped to engage the vault 5, upon movement thereof between the plates as illustrated (Fig. 5), and effect a shifting of the plates or bearing brackets 23, and 24, as and for purposes to be later described.

As above mentioned the flexible elements 25, and 26, are closed loops of flexible material such as belting 170, and to facilitate adjustment thereof and the detachment thereof after operation, an adjusting plate 177, and buckle 178, are provided, (Figs. 5 and 20).

The adjusting plate 177, illustrated is a rectangular plate having a substantially centrally disposed rectangular opening 179, therein through which the belting 170, may be extended and adjusted, and forming spaced parallel webs connected together at their respective ends. The belting 170, is extended through the opening, looped back upon itself and an end 181, thereof is looped about one of the webs of the plates 177, and seamed or otherwise suitably secured thereto. The buckle 178, is formed of a similar plate and in a similar manner. A web 182, of the buckle 178, is arranged through the looped end of the belt extending from the plate 177, and a web 183, thereof is serrated or provided with extending teeth for engaging in suitable apertures formed in or perforated through an end 184, of the belt 170, which may be extended through the buckle and engaged with the serrated web thereof to arrange the belt in a closed loop for operation as above described.

Adjustment of the closed loop flexible elements is effected by adjusting the plate 177, along the belt 170, (Fig. 20), to the right for decreasing the loop and to the left for increasing the loop in accordance with requirements. The plate 177, remains in adjusted relationship by frictional engagement with the belt. To disengage the buckle 178, from the end 184, of the belt, the web 183, of the buckle is engaged and lifted or twisted to the right when the belt disengages from the serrated web 183.

It is an object of this invention to provide means for power actuating the winch mechanism when conditions permit and to accomplish this I have shown the power unit 27, comprising in the present embodiment, a support 191, such as a plank or suitable base, adapted to be arranged at or along one side of the winch mechanism (Figs. 2 and 3), and carrying power equipment including, electric motors 192, and 193, connected through flexible couplings 194, and 195, to a speed reducing device 196, and electrically coupled to a battery 197, all of which may be suitable commercial devices of suitable size and capacity.

A gear housing 198, extends from the speed reducing device 196, into which a drive shaft 199, of the speed reducing device extends to receive a bevel gear 201, which is suitably secured to the shaft 199, for rotation therewith, and is arranged to drive oppositely disposed bevel gears 202, and 203, secured to stub shafts 204, and 205, journalled in the housing 198, and suitably secured to universal joint devices 206, and 207, arranged adjacent the housing 198. A housing cover 208, incloses the gears 201, 202, and 203, and forms a part of the bearings for the shafts 204, and 205.

Keyed spindles 209, of rectangular form, extend from each one of the universal joint devices 206, for engagement with the connecting shafts 28, and 29.

The connecting shafts 28, and 29, are of like form and one is required for connecting each winch pedestal 11 with the power unit 27. A suitable shaft for detachably effecting this connection is illustrated (Figs. 2, 9, 23, 24 and 25). A shaft body 211, preferably of square or rectangular form or shaped to conform to and engage over the spindle 209, forms a driving connection therewith and a slideable extension 212, therefor of similar form is engaged over the opposite end of the body 211, and extends therefrom to snugly engage over a rectangular portion 213, of the universal joint 71, which is formed in accordance with the proportions of the body 211.

The spindle 72, of the universal joint 71, extends within the body 211, to engage a compression spring 214. The spring 214, is anchored in the body 211, by means of a transverse pin 215, and by engagement with the spindles 72, and 209, centralizes the body 211.

The connecting shafts 28, and 29, are coupled for operation by positioning an end of the body 211, over the spindle 209, against the compression of the spring 214, and so that the opposite end of the body 211, will receive the spindle 72, the extension 212, is then extended and engaged with the squared portion 213, of the universal joint 71, to complete the driving connection. Dissasembly is accomplished by reversing the above operations.

In accordance with my invention a remote control is provided whereby the winch mechanism may be actuated and controlled from a remote location, and to accomplish this push buttons 216, and 217, or other suitable circuit closing switches, are connected in circuit with a relay switch 218, through a cable 219, to which the push buttons 216, and 217, are attached. The cable 219, may be extended to any remote location.

The relay switch 218, is connected to the battery through a cable 221, to the motor 192, through a cable 222, and to the motor 193, through a cable 223. Cables 224, and 225, complete the electrical circuit by connecting the motors 192, and 193, with the battery 197.

With right hand motors 192, and 193, mechanically connected so that the motor 192, will actuate the winch mechanism to lower the vault 5, and the motor 193, will actuate the winch mechanism to raise the vault, one of the push buttons, such as the push button 216, is connected through the relay switch 218, to control the motor 193, for raising the vault, and the other or push button 217, is similarly connected to the motor 192, for lowering the vault.

To provide means for mechanically or automatically controlling or releasing the snubbing cable 162, I have shown a winding drum 225, one of which is arranged on each one of the connecting shafts 28, and 29, in reverse positions, (Figs. 2, 18 and 19):

The drum 225, includes a core 226, centrally apertured to slip over the body 211, of the shaft 28, and having spaced annular flanges 227, thereon between which the two parts of a split winding drum 228, are rotatably secured, such as by means of clamp bolts 229. The drum 228, is or may be flanged and the cable 162, is wrapped about the drum, extended through a flange thereof, and secured to a side of the drum, such as by means of a screw 231. A ratchet pawl 232, is pivotally secured to a side of the drum 228, by means of a shoulder screw 233, and arranged for engagement with ratchet teeth or notches formed in one of the flanges 227, of the core 226, to form a driving connection.

The ratchet connection permits an operator to assemble the winch and apply the cable 162, and then to tighten the cable 162, by manually rotating the drum 228. The ratchet 232, may then be engaged in one of the notches or with one of the ratchet teeth to secure the cable. Rotation of the shaft 28, in a counterclockwise direction (Fig. 18), which effects a raising movement of the vault and a lowering movement of the casket, as above described, also pays out cable 162, from the drum 228, and while the cable 162, remains in tension due to the load thereon, the pawl 232, remains in engagement with the ratchet teeth, but when the tension is relieved the pawl 232, disengages from the ratchet due to centrifugal action of a weight element 234, carried by the pawl. Upon disengagement of the ratchet and movement thereof to a limiting pin 235, the drum 228, comes to rest on the core 226, because of the counterbalancing effect of the pawl 232, and the weight element 234, carried thereby, as indicated by the dotted line position (Fig. 18).

To provide means for concealing the winch mechanism during operation such as during a burial ceremony and such a means which may be readily attached or detached, I have shown (Figs. 1, 3, 4, 5, 6, 11, 20 and 21), the frame elements or parts 31, and 32, which may be plain boards attached to the bearing brackets 23, and 24, respectively, by means of attachment brackets 241, carrying cover blankets 33, which may be of material finished to imitate grass or any other suitable material and secured to the frame elements 31, and 32, by means of tacks, or the like. The blankets 33, should obviously be of sufficient width to reach the ground and may be wider.

To facilitate interlockingly engaging the frame parts 31, and 32, with the brackets 23, and 24, by means of a twisting movement thereof, the attachment brackets 241, are formed of sheet metal plates having an upwardly and rearwardly extending web 243, under which an edge of the frame parts may be inserted and an oppositely disposed and parallel upwardly extending web 244, forming an abutment for holding the frame part against the web 243.

One of the attachment brackets 241, is secured to the top of each one of the brackets 23, and 24, by means of screws or the like, and the frame parts 31, and 32, may be attached thereto by inserting an edge of the frame parts under the rearwardly extending portion of the web 243, and depressing or dropping the opposite edge of the frame part in front of the web 244. The weight of the blanket 242, attached to the frame part holds the frame part against the plate or bracket 241, adjacent the web 244.

The end cover attachments 34, and 35, (Figs. 4, 21 and 22), are alike in form and interchangeable or attachable to either one of the ends of the winch mechanism and include a curved sheet metal plate 246, of sufficient length to extend across the end of an assembled winch mechanism having a depending support plate 247, secured thereto adjacent each one of the ends thereof to engage the drum shaft 13, of the winch units for supporting the plate 246, thereon.

A curved slot 248, is cut upwardly from the bottom edge of the support plates 247, forming a hook 249, for engaging over and in front of the drum shaft 13, so that the cover attachment may be engaged over the drum shaft 13, and rotated into position as shown (Fig. 21). The support plates 247, are slotted back from the forward edge to receive the track 17, and the curved plate 246, extends over the track for direct support thereon. A spring 251, having a hook engagement with the track 17, and anchored in the plate 247, as indicated, normally holds the cover attachment in the position shown, (Fig. 21).

A cam surface 252, formed on the inner edge of the support plates 247, engages the vault 5, as an incident to movement thereof to effect rotation of the cover attachment about the drum shaft 13, to the position shown (Fig. 22), to retract the concealing means and uncover the track 17, so that the cover carriers 15, and 16, may be moved into position for the assembly of the cover to the vault. The cover blankets 36, similar to the blankets 33, may be suitably attached to the plates 246, for movement therewith.

To provide a rigid anti-friction support or casket rest at the ends of the winch mechanism, anti-friction rollers 254, rotatably mounted on pintles 255, are positioned in suitable openings in the plate 246, and secured in operative relationship by correspondingly apertured cover plates 256, which are suitably secured to the plates 246, by means of rivets or the like and in turn secure the pintles 255, thereto and in fixed relationship.

A description of operation of all of the sections or sectional units has been given as an incident to or immediately after the detailed description of the individual sections, and it will be obvious from the foregoing description that the unitary structure and the adaptation for interlocking connections between the several units facilitates the formation of either one of a series of combinations of apparatus and the adaptability of the apparatus to requirements, such as a plain burial winch, including the units 10 to 17, inclusive, as shown (Figs. 7, 10, 12 and 13), which is adaptable to grave excavations varying in size from relatively small to a maximum of relatively large length and width dimensions. To this plain winch may be added the units 18, 19 and 21 to 26, inclusive, by interlocking connection therewith, sectional units for temporarily supporting a casket over a burial vault carried by the winch and other sectional units for lowering the casket or depositing the casket into the vault as illustrated, (Figs. 2, 8, 9 and 11). The power unit 27, may be attached to these combinations as above described or they may be manually operated by means of a suitable crank.

To the latter combination the units or sections 31 to 36, inclusive, may be similarly added when required, (Figs. 1, 3 to 6, inclusive, 21 and 22), for concealing the operating mechanism as above described.

The complete combination when in use is positioned as illustrated, (Fig. 3), with the burial vault 5, suspended from or carried by the winch mechanism and by means of its weight and engagement therewith, stretching the flexible elements 25, and 26, across the excavation above the vault ready to receive the casket 6, illustrated in dotted lines, and the temporary support units 18, and 19, also positioned by the vault to receive the casket. After the casket is placed on the temporary support units, an operator standing at one side of the apparatus or in some remote position may cause or effect the operation of depositing the casket 6, into the vault 5, by pressing the push button 216, (Fig. 2), causing the vault to raise and thus release the temporary support units 18, and 19, which deposit the casket upon the flexible elements 25, and 26, subject to the action of the snubbing means, and simultaneously to release the tension on the flexible elements 25, and 26, in accordance with the rate and extent of movement of the burial vault. Since the casket is entirely supported by the flexible elements 25, and 26, after release of the temporary support units 18, and 19, continued movement of the vault lowers the casket into the vault after which the flexible elements may be disengaged and removed. The cover 7, may then be manually positioned and further upward movement of the vault effects the assembly of the cover as described in my above mentioned co-pending application after which the push button 217, may be pressed to actuate the winch mechanism for lowering the entire and complete assembly into the grave excavation.

It is thought that the invention and many of its attendant advantages will be understood from the foregoing description, and it will be apparent that various changes may be made in the form, construction, and arrangement of the parts without departing from the spirit and scope of the invention, or sacrificing all of its material advantages, the form hereinbefore described being merely a preferred embodiment thereof.

I claim:

1. The combination with a vault lowering mechanism whereby a burial vault may be suspended and adjusted vertically in a grave excavation, of mechanical casket carrying devices having a limited connection with a burial vault suspended from the lowering mechanism and being adapted to receive and carry a casket to be deposited into the burial vault, said mechanical casket carrying devices being operable to deposit the casket supported thereby into the burial vault upon predetermined movement thereof.

2. The combination with a vault lowering mechanism whereby a burial vault may be suspended and adjusted vertically in a grave excavation, of devices including casket carrying means and connecting means therefor arranged to engage the bottom of a burial vault suspended from the lowering mechanism for supporting a casket over the burial vault and being operable upon movement of the burial vault to deposit the casket therein.

3. The combination with a vault lowering mechanism whereby a burial vault may be suspended and adjusted vertically in a grave excavation, of devices including spaced supports carried by the lowering mechanism, and a plurality of casket carrying flexible elements engaged therewith and engaging beneath and controlled by a burial vault suspended from the lowering mechanism whereby a casket to be deposited in said burial vault may be supported and deposited into the burial vault as an incident to movement thereof.

4. The combination with a vault lowering mechanism whereby a burial vault may be suspended and adjusted vertically in a grave excavation, of casket carrying devices including spaced supports carried by the lowering mechanism, and at least one flexible element engaged therewith and arranged to extend across the grave excavation above and below a burial vault suspended from the lowering mechanism and being adapted to receive a casket and operable by means of movement of the burial vault to deposit the casket therein.

5. The combination with a vault lowering mechanism whereby a burial vault may be suspended and adjusted vertically in a grave excavation, of means including spaced supports carried by the lowering mechanism, and flexible elements engaged therewith and being separately connected with a burial vault suspended from the lowering mechanism and extending across the grave excavation above the vault for receiving a casket to be deposited into the vault, said means being operable upon movement of the burial vault effected by the lowering mechanism to deposit the casket into the burial vault.

6. The combination with a vault lowering mechanism whereby a burial vault may be suspended and adjusted vertically in a grave excavation, of support means carried by the lowering mechanism, and casket carrying flexible elements engaged therewith and arranged to extend in spaced relationship across a grave excavation above and below a burial vault suspended from the lowering mechanism whereby a casket may be received and deposited into the burial vault subject to movement thereof.

7. The combination with a vault lowering mechanism whereby a burial vault may be suspended and adjusted vertically in a grave excavation, of combined support and connecting mechanism cooperating therewith and adapted to engage the vault and to support a casket over a vault suspended from the lowering mechanism when engaged with the vault whereby the weight of the casket is counterbalanced by the weight of the vault.

8. The combination with a vault lowering mechanism whereby a burial vault may be suspended and adjusted vertically in a grave excavation, of pivoted relatively rigidly supported temporary support devices arranged to temporarily support a casket over and for control by a burial vault suspended from the lowering mechanism, and flexible elements arranged and supported to receive the casket from said temporary support devices and being adapted to lower the casket into the vault as an incident to movement of the vault, said temporary support devices being connected with said flexible elements and thereby being operable as an incident to movement of the burial vault to position the casket upon said flexible elements.

9. A sectional burial apparatus including in combination a plurality of sectional winch units adapted for arrangement in spaced relationship and to lift or lower a burial container suspended therebetween, said winch units each being formed of a series of interlockingly connected parts.

10. A sectional burial apparatus including in combination a plurality of sectional winch units adapted for arrangement in spaced relationship and to lift or lower a burial container suspended therebetween, said winch units each being formed of a series of interlockingly connected parts including a winch pedestal, a plain bearing pedestal, a telescoping drum shaft extending between the pedestals, and a relatively rigid spacing device.

11. A sectional burial apparatus comprising a plurality of winch units arranged in spaced relationship and to lift or lower a burial container suspended therebetween, said winch units each being formed of a series of interlockingly connected parts including a winch pedestal and a plain bearing pedestal each having a laterally projecting shaft, a drum shaft arranged to engage the shaft of each pedestal at its ends and being extensible in accordance with the spacing of said pedestals, and a relatively rigid spacing means extending between the pedestals.

12. A sectional burial apparatus comprising a plurality of winch units arranged in spaced relationship and to lift or lower a burial container suspended therebetween, said winch units each being formed of a series of interlockingly connected parts including a winch pedestal and a plain bearing pedestal each having a laterally projecting shaft, a drum shaft arranged to engage the shaft of each pedestal at its ends and being extensible in accordance with the spacing of said pedestals, a carriage track extending across the pedestals and having an interlocking connection with one thereof, and an adjustable device cooperating with the track for limiting the spacing of the pedestals in accordance with requirements.

13. A sectional burial apparatus including in combination a plurality of sectional winch units adapted for arrangement in spaced relationship and to lift or lower a burial container suspended therebetween, and a casket supporting and lowering mechanism arranged for operable connection therewith upon occasion, said winch units and said casket supporting and lowering mechanism being formed of a series of interlockingly connected parts.

14. A sectional burial apparatus comprising a plurality of winch units arranged in spaced relationship and to lift or lower a burial container suspended therebetween, and a casket supporting and lowering mechanism arranged for operable connection therewith upon occasion, said winch units and said casket supporting and lowering mechanism being formed of a series of interlockingly connected parts including extensible parts whereby the apparatus may be adjusted in accordance with requirements.

15. A sectional burial apparatus comprising a plurality of winch units arranged in spaced relationship and to lift or lower a burial container suspended therebetween, and a casket supporting and lowering mechanism arranged for operable connection therewith, said casket supporting and lowering mechanism including relatively rigid shafts mounted in parallel and laterally disposed with respect to the burial container, and a plurality of flexible elements contacting the burial container and extending about the rigid shafts and over the burial container for receiving a casket and being operable upon movement of the burial container to deposit the casket into the burial container.

16. A sectional burial apparatus comprising a plurality of winch units arranged in spaced relationship and to lift or lower a burial container suspended therebetween, and a casket supporting and lowering mechanism arranged for operable connection therewith, said casket supporting and lowering mechanism including relatively rigid shafts mounted in parallel and laterally disposed with respect to the burial container, and means including flexible elements arranged adjacent the ends of the burial container and embracing said shafts and the container and being connected across the top of the container whereby a casket positioned over the burial container may be deposited therein.

17. A sectional burial apparatus comprising a plurality of winch units arranged in spaced relationship and to lift or lower a burial container suspended therebetween, and a casket supporting and lowering mechanism arranged for operable connection therewith, said casket supporting and lowering mechanism including telescoping shafts interlockingly engaged with the winch units, and devices forming a casket support over the burial container and supported by said shafts and being connected for control by the burial container for depositing the casket therein.

18. The combination with a burial device of the character described, of a temporary casket supporting means comprising, a support rail, an arm extending laterally therefrom and having a pivoted connection with a support, means forming a toggle link device connected therewith for rendering said arm rigid, and controlled means for breaking the toggle link to release the arm.

19. The combination with a burial device of the character described, of a temporary casket supporting means comprising, a body forming a bearing plate, an arm pivotally connected thereto and extending therefrom to support a casket, and a toggle link device cooperating with said body and acting on said arm to render same temporarily rigid.

20. The combination with a burial device of the character described, of a temporary casket supporting means comprising, a body forming a bearing plate, a rotatable locating shaft extending through said body, a supporting arm having a pivoted connection with said body at a point remote from said shaft, a crank arm mounted on said shaft for rotation therewith, and a link connecting said crank arm with the supporting arm at a point remote from the body and arranged to cooperate with said crank arm to form a toggle for rendering the supporting arm rigid for supporting a casket.

21. The combination with a burial device of the character described, of a temporary casket supporting means comprising, a body forming a bearing plate, an arm pivotally connected thereto and extending therefrom to support a casket, a toggle link device cooperating with said body and acting on said arm to render same temporarily rigid, and means connected for control by a burial vault suspended from the lowering mechanism whereby the toggle link device is controlled.

22. The combination with a burial device of the character described, of a temporary casket supporting means comprising, a body forming a bearing plate, a rotatable locating shaft extending through said body, a supporting arm having a pivoted connection with said body at a point remote from said shaft, a crank arm mounted on said shaft for rotation therewith, and a link connecting said crank arm with the supporting arm at a point remote from the body and arranged to cooperate with said crank arm to form a toggle for rendering the supporting arm rigid for supporting a casket, said rotatable shaft being connected for control by a burial vault arranged to receive the casket.

23. The combination with an apparatus of the character described including a locating shaft of, a shiftable body forming a bearing plate comprising a foot and lower belt guide portion, an upper belt guide, and an intermediate body portion having an elongated opening therein for receiving the locating shaft.

24. A burial apparatus comprising, a winch mechanism arrangeable about a grave excavation and to lift or lower a burial vault therein, casket lowering means arranged over the burial vault and to deposit a casket therein, a pivoted relatively rigidly supported receiving means for receiving a casket and depositing the casket on said lowering means to be deposited into the vault, and snubbing means acting on said last mentioned means whereby the depositing action thereof is controlled.

25. A burial apparatus comprising, a winch mechanism arrangeable about a grave excavation and to lift or lower a burial vault therein casket lowering means arranged over the burial vault and to deposit a casket therein, and a temporary receiving mechanism arranged to cooperate therewith comprising spaced guide rails arranged above the burial vault and extending substantially across the vault above the casket lowering means, and means for supporting said guide rails, including a locking device whereby the rails are rendered relatively rigid while in casket receiving position, said means being mechanically operable to release said rails and to permit the temporary receiving mechanism to deposit the casket on the casket lowering means.

26. A burial apparatus comprising, a winch mechanism arrangeable about a grave excavation and to lift or lower a burial vault therein, casket lowering means arranged over the burial vault and to deposit a casket therein, and a temporary receiving mechanism arranged to cooperate therewith comprising spaced guide rails arranged above the burial vault and extending substantially across the vault above the casket lowering means, and means for supporting said guide rails, including a locking device whereby the rails are rendered relatively rigid while in casket receiving position, said means being mechanically operable to release said rails and to permit the temporary receiving mechanism to deposit the casket on the casket lowering device and being retractable to an unobstructive position.

27. A burial apparatus comprising, a winch mechanism arrangeable about a grave excavation and to lift or lower a burial vault therein, casket lowering means arranged over the burial vault and to deposit a casket therein, a temporary receiving mechanism including support arms cooperating therewith whereby a casket may be received and deposited on the casket lowering means, and means connecting the temporary receiving mechanism with a burial vault carried by the winch mechanism whereby the support arms are moved into a relatively rigid casket receiving position and permitted to retract to deposit the casket on the casket lowering device.

28. A burial apparatus comprising, a winch mechanism arrangeable about a grave excavation and to lift or lower a burial vault therein, including corner posts arranged in rectangular formation about the excavation, and means for receiving and lowering a casket into a burial vault suspended from the winch mechanism comprising, locating shafts arranged in parallel relationship and extending between opposed pairs of the corner posts, shiftable bodies arranged on said shafts in spaced relationship, removable belts engaging said shiftable bodies and located thereby, said belts extending across the burial vault for lowering a casket and contacting the vault for control thereby, and temporary support devices for receiving a casket and depositing same on the lowering belts, including pivoted arms indirectly connected to the locating shafts, and toggle link devices adjusted by said locating shafts whereby the pivoted arms are rendered rigid or actuated to deposit the casket onto the lowering belts.

29. The combination with a burial device of the character described, of a temporary casket supporting means comprising, a body forming a bearing plate, an arm pivotally connected thereto and extending therefrom to support a casket, a toggle link device cooperating with said body and acting on said arm to render same temporarily rigid, and a snubbing device acting on the toggle link device to control movement thereof.

30. The combination with a burial device of the character described, of a temporary casket supporting means comprising, spaced movable carriers, toggle link devices individualized thereto and being arranged to render the carriers rigid, and a snubbing device connecting the toggle link devices in pairs to lock and control the action thereof upon release.

31. A burial apparatus comprising, a winch mechanism arrangeable about a grave excavation and to lift or lower a burial vault therein, including corner posts arranged in rectangular formation about the excavation, and means for receiving and lowering a casket into a burial vault suspended from the winch mechanism comprising, locating shafts arranged in parallel relationship and extending between opposed pairs of the corner posts, shiftable bodies arranged on said shafts in spaced relationship, removable belts engaging said shiftable bodies and located thereby, said belts extending across the burial vault for lowering a casket and contacting the vault for control thereby, and temporary support devices for receiving a casket and depositing same on the lowering belts, including pivoted arms indirectly connected to the locating shafts, and toggle link devices adjusted by said locating shafts whereby the pivoted arms are rendered rigid or actuated to deposit the casket onto the lowering belts, said locating shafts being rotatably mounted and connected to the burial vault for rotary adjustment thereby.

32. The combination with a burial winch mechanism, of adjustable temporary support means for receiving a casket to be deposited into a burial vault carried by the winch mechanism, fixed anchor devices, and adjustable means connecting the temporary support means with said fixed anchor devices whereby the operating position of said temporary support means may be adjusted in accordance with requirements.

33. The combination with a burial winch mechanism, of adjustable temporary support means for receiving a casket to be deposited into a burial vault carried by the winch mechanism, said support means including support arms pivotally mounted on carriers and located and having relatively rigid casket supporting positions at the four corners of a rectangle, and separate screw adjusting means engaging the carriers for independently varying the elevation of the support arms.

34. The combination with a burial winch mechanism, of adjustable temporary support means for receiving a casket to be deposited into a burial vault carried by the winch mechanism, said support means including support arms pivotally mounted on carriers and located and having relatively rigid casket supporting positions at the four corners of a rectangle, fixed anchor devices individualized to each assembly of said arms and carriers, and adjustable devices for connecting the anchor devices with said carriers whereby the elevation of the carriers may be adjusted.

35. The combination with a vault lowering mechanism whereby a burial vault may be suspended and adjusted vertically in a grave excavation, of separate casket carrying means associated therewith and adapted to receive a casket and being operable to deposit the casket into the burial vault, said casket carrying means including an element engaging and controlled by the vault whereby movement of the casket into the vault is controlled by the vault.

36. The combination with a vault lowering mechanism whereby a burial vault may be suspended and adjusted vertically in a grave excavation, of pivoted relatively rigidly supported temporary support devices arranged above and to temporarily support a casket over a burial vault suspended from the lowering mechanism, and flexible elements connected with and adapted to control said support devices and being arranged adjacent and to receive the casket therefrom and to lower the casket into the vault, said flexible elements being removably engaged with and operable subject to movement of the burial vault.

37. A burial apparatus comprising, a winch mechanism arrangeable about a grave excavation and to lift or lower a burial vault therein, including corner posts arranged in rectangular formation about the excavation, and means for receiving and lowering a casket into a burial vault suspended from the winch mechanism comprising, locating shafts arranged in parallel relationship and extending between opposed pairs of the corner posts, shiftable bodies arranged on said shafts in spaced relationship, removable belts engaging said shiftable bodies and located thereby, said belts extending across the burial vault for lowering a casket and contacting the vault for control thereby, and temporary support devices for receiving a casket and depositing same on the lowering belts, including pivoted arms carried by the shiftable bodies and toggle link devices adjusted by said locating shafts whereby the pivoted arms are rendered rigid or actuated to deposit the casket, said shiftable bodies having inwardly facing cam surfaces engaged by the burial vault as an incident to movement thereof in the grave excavation whereby the bodies may be moved laterally as and for the purpose described.

38. A burial apparatus comprising, a winch mechanism arrangeable about a grave excavation and to lift or lower a burial vault therein, including corner posts arranged in rectangular formation about the excavation, and means for receiving and lowering a casket into a burial vault suspended from the winch mechanism comprising locating shafts arranged in parallel relationship and extending between opposed pairs of the corner posts, shiftable bodies arranged on said shafts in spaced relationship, removable belts engaging said shiftable bodies and located thereby, said belts extending across the burial vault for lowering a casket and contacting the vault for control thereby, and temporary support devices for receiving a casket and depositing same on the lowering belts, including pivoted arms carried by the shiftable bodies and toggle link devices adjusted by said locating shafts whereby the pivoted arms are rendered rigid or actuated to deposit the casket, said shiftable bodies carrying interlockingly attached concealing devices whereby the mechanism is concealed and having inwardly facing cam surfaces engaged by the burial vault as an incident to movement thereof in the grave excavation whereby the bodies may be moved laterally as and for the purpose described.

WILBERT W. HAASE.